US008899515B2

(12) United States Patent
Guptaa et al.

(10) Patent No.: US 8,899,515 B2
(45) Date of Patent: Dec. 2, 2014

(54) FOLDING CONFIGURATION FOR AIR VEHICLE

(75) Inventors: Suneal Guptaa, Towson, MD (US); Jeremy Bley, Parkville, MD (US)

(73) Assignee: Textron Systems Corporation, Wilmington, MA (US)

( * ) Notice: Subject to any disclaimer, the term of this patent is extended or adjusted under 35 U.S.C. 154(b) by 74 days.

(21) Appl. No.: 13/475,371

(22) Filed: May 18, 2012

(65) Prior Publication Data

US 2013/0306789 A1 Nov. 21, 2013

(51) Int. Cl.
 *B64C 3/56* (2006.01)
(52) U.S. Cl.
 USPC .................. 244/49; 244/3.27; 244/3.29
(58) Field of Classification Search
 USPC .......................... 244/3.27, 3.29, 49
 See application file for complete search history.

(56) References Cited

U.S. PATENT DOCUMENTS

| 1,448,166 | A | * | 3/1923 | Strong | 244/3.29 |
|---|---|---|---|---|---|
| 3,744,741 | A | * | 7/1973 | Christian et al. | 244/16 |
| 4,485,991 | A | * | 12/1984 | Fuller | 244/49 |
| 5,074,493 | A | | 12/1991 | Greenhalgch | |
| 5,078,339 | A | | 1/1992 | Lapidot | |
| 5,417,393 | A | | 5/1995 | Klestadt | |
| 6,748,871 | B2 | * | 6/2004 | Hellman | 102/490 |
| 7,331,546 | B2 | * | 2/2008 | Ifju et al. | 244/123.1 |
| 8,714,476 | B2 | * | 5/2014 | Reany et al. | 244/46 |
| 2004/0245393 | A1 | * | 12/2004 | Ifju et al. | 244/123 |
| 2006/0284005 | A1 | * | 12/2006 | Ifju et al. | 244/49 |
| 2010/0057285 | A1 | * | 3/2010 | Murphy et al. | 701/23 |
| 2010/0282906 | A1 | * | 11/2010 | Sanderson et al. | 244/123.1 |
| 2010/0288870 | A1 | * | 11/2010 | Geswender et al. | 244/3.27 |
| 2011/0036939 | A1 | | 2/2011 | Easter | |
| 2011/0168838 | A1 | * | 7/2011 | Hornback et al. | 244/63 |
| 2013/0099049 | A1 | * | 4/2013 | Reany et al. | 244/46 |
| 2013/0291753 | A1 | * | 11/2013 | Nikkel et al. | 102/473 |

OTHER PUBLICATIONS

International Search Report dated Jul. 25, 2013 for PCT/US2013/035267.

* cited by examiner

*Primary Examiner* — Timothy D Collins
*Assistant Examiner* — Steven Hawk
(74) *Attorney, Agent, or Firm* — Venable LLP; Jeffri A. Kaminski

(57) ABSTRACT

An air vehicle, as well as a method for folding an air vehicle for storage, may include a fuselage and a wing connected to the fuselage. The wing may include two ends positioned opposite from each other, and the wing may be substantially perpendicular to the fuselage. At least one of the ends may define a space therebetween the fuselage and the wing. The space may be sized to receive a potion of the wing when the wing is wrapped around the fuselage.

10 Claims, 4 Drawing Sheets

FOLDING CONFIGURATION FOR AIR VEHICLE

BACKGROUND

Embodiments of the present invention relate generally to new and useful improvements in air vehicles and/or aircraft, and more particularly to an apparatus and method for folding the flexible and/or bendable wings of an air vehicle and/or aircraft for storage.

The folding storage of air vehicles, in particular unmanned aerial vehicles, is generally known in the art. As shown in FIGS. 1 and 2 (Prior Art), these known methods usually involve a bendable-wing 20 design, where the wings 20A, 20B of an air vehicle 100 wrap around the fuselage 10 and slide into a storage tube (not shown) fully assembled. Such a configuration permits the aircraft to be stored in a smaller space, and allows the aircraft to launch immediately upon removal from the storage tube. However, a disadvantage of this known method is that these types of wings 20 must fold around the air vehicle 100 under a volumetric constraint, such as the volumetric constraint of a launcher tube, for example. Also, while one wing 20B is free to wrap around the air vehicle 100 an unlimited number of times, the other wing 20A can only wrap less than one complete revolution around the fuselage 10, as it typically intersects with the fuselage 10 and cannot pass through. Thus, the span of the wing 20 is limited by the tip of the wing 20A contacting the joint between the fuselage 10 and the wing 20, when the wing 20 is in the wrapped condition. Such aircrafts are known to suffer from poor flight performance due to the limitations of the wing span.

In short, there exists a need in the art for an air vehicle with an unlimited wing span that is able to be easily folded and stored. Additionally, a need exists for a storable air vehicle having bendable wings that are adapted to a strong wind tolerance, including tolerance of wind variation, direction and speed.

SUMMARY

According to an embodiment, an air vehicle may include a fuselage, and a wing connected to the fuselage. The wing may include two ends positioned opposite each other, and may be substantially perpendicular to the fuselage. At least one of the ends may define a space therebetween the fuselage and the wing. The space may be sized to receive a portion of the wing when the wing is wrapped around the fuselage.

In one embodiment, the portion of the wing may be adapted to pass entirely through or partially through the space.

In another embodiment, the wing may include a first portion having a first end of the two ends, a second portion having a second end of the two ends, and a center portion. The space may be defined between the fuselage and the center portion of the wing. The first portion of the wing may be adapted to wrap around the fuselage, and the first end may be adapted to pass through the space in a wrapped position of the first portion, and the second portion of the wing may be adapted to wrap around the wrapped first portion in the wrapped position.

In a further embodiment, the space may be sized to allow the end of the wing to pass between the fuselage and wing for storage, and to allow the end of the wing to rapidly release for use.

In one embodiment, the space may be sized to allow the wing to pass between the fuselage and the wing multiple times for storage.

According to another embodiment, an apparatus may include an axially-defined object, and a flexible member connected to the object. The flexible member may include two ends positioned opposite each other. The flexible member may extend out from the object on both sides of the object. The object may define at least a part of a boundary defining a space that is sized and positioned to receive a portion of the flexible member when the flexible member is wrapped around the object.

In one embodiment, the portion of the flexible member may be adapted to pass entirely through or partially through the space.

In another embodiment, the space may be defined by the object only.

In an embodiment, the flexible member may include a first portion having a first end of the two ends, a second portion having a second end of the two ends, and a center portion. The first portion of the flexible member may be adapted to wrap around the object, and the first end may be adapted to pass through the space in a wrapped position of the first portion, and the second portion of the flexible member may be adapted to wrap around the first portion in the wrapped position.

In another embodiment, the space may be defined between the object and the center portion of the flexible member. In a further embodiment, the space may be defined along the object and apart from the center portion of the flexible member.

In a further embodiment, the space may be sized to allow the end of the flexible member to pass between the object and flexible member for storage, and to allow the end of the flexible member to rapidly release for use.

In one embodiment, the space may be sized to allow the flexible member to pass between the object and the flexible member multiple times for storage.

According to a further embodiment, a method for packaging an air vehicle may include the steps of: wrapping a wing around a fuselage, where the wing may include two ends positioned opposite each other, and where the wing may be substantially perpendicular to the fuselage. The method may also include inserting a portion of the wrapped wing through a space positioned between the wing and the fuselage.

In one embodiment, the method may further include: connecting a center portion of the wing to the fuselage; wrapping a first portion of the wing around the fuselage; inserting a first end of the two ends through the space in a wrapped position of the first portion; and wrapping a second portion of the wing around the first portion in the wrapped position.

In another embodiment, the method may include inserting the fuselage and the wing in the wrapped position into a storage container for storage. The method may also include removing the fuselage and the wing in the wrapped position from the storage container, and rapidly releasing the end of the wing from the space for use.

According to another embodiment, an air vehicle may include a fuselage and a wing connected to the fuselage. The wing may have two ends positioned opposite each other. The wing may extend out from the fuselage on both sides of the fuselage. The fuselage may define at least part of a boundary defining a space that is sized and positioned to receive a portion of the wing when the wing is wrapped around the fuselage.

According to one embodiment, the space may be defined by the fuselage only.

According to another embodiment, the wing may include a first portion having a first end of the two ends, a second portion having a second end of the two ends, and a center portion. The space may be defined between the fuselage and the center portion of the wing. The space may alternatively be defined along the fuselage and apart from the center portion of the wing.

This summary is provided merely to introduce certain concepts and not to identify any key or essential features of the claimed subject matter. Further features and advantages of embodiments of the invention, as well as the structure and operation of various embodiments of the invention, are described in detail below with reference to the accompanying drawings.

BRIEF DESCRIPTION OF THE DRAWINGS

The foregoing and other features and advantages of embodiments of the invention will be apparent from the following, more particular description of embodiments of the invention, as illustrated in the accompanying drawings wherein like reference numbers generally indicate identical, functionally similar, and/or structurally similar elements. Unless otherwise indicated, the accompanying drawing figures are not to scale.

DETAILED DESCRIPTION

Various embodiments of the invention are discussed herein. While specific embodiments are discussed, specific terminology is employed for the sake of clarity. However, the invention is not intended to be limited to the specific terminology so selected and it should be understood that this is done for illustration purposes only. A person skilled in the relevant art will recognize that other components and configurations can be used without parting from the spirit and scope of the invention. Each specific element includes all technical equivalents that operate in a similar manner to accomplish a similar purpose.

Figure 3:
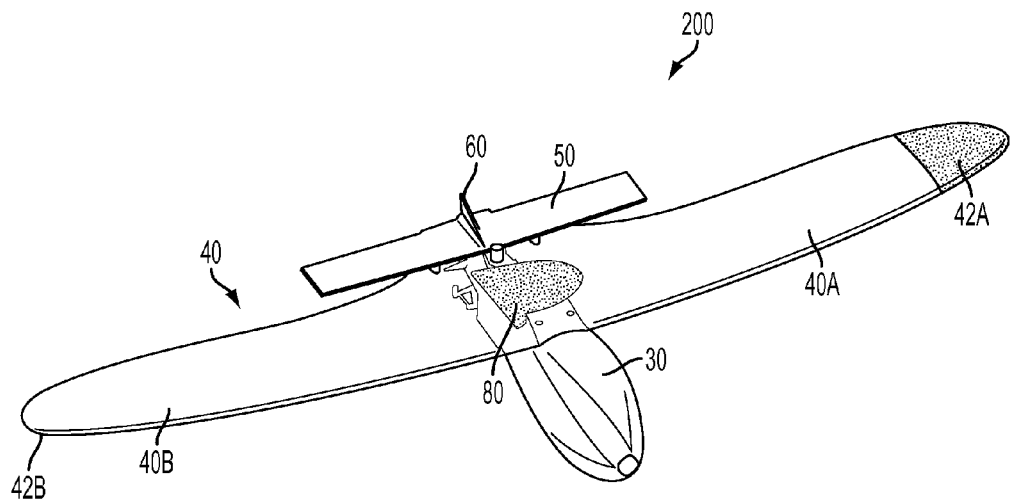
FIG. 3 depicts a top-front-left perspective view of an air vehicle in an operating position, according to an embodiment of the present invention
Figure 4:
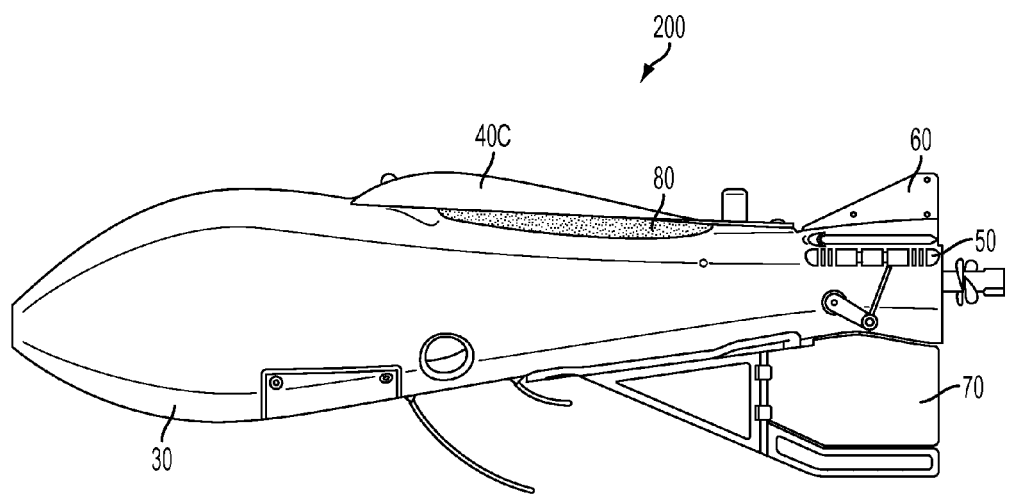
FIG. 4 depicts a side cross-sectional view of the air vehicle in the operating position according to FIG. 3.

Referring again to the drawings, there is shown in FIG. 3 a perspective view of an air vehicle 200 in an operating position including, for example, a fuselage 30, a wing mechanism 40, a horizontal stabilizer 50, a vertical stabilizer 60, and a rudder 70 (See FIG. 4). The wing mechanism 40 may be a large horizontal wing in the cross-sectional shape of an airfoil. The wing mechanism 40 may be adapted to deflect air downward as the plane moves forward, to generate "lift" to support the air vehicle 200 in flight. The wing mechanism 40 may also be used to stabilize the air vehicle's "roll," i.e. tilting to the right or left. The wing mechanism 40, for example, may be flexible and/or foldable camber line wings. According to another example, the wing mechanism 40 may be made of fiberglass and/or carbon fiber.

The horizontal stabilizer 50, also called a tail plane, may be mounted at the tail of the air vehicle 200 and may be used to stabilize the air vehicle's "pitch," i.e. up and down tilting movement of the aircraft. The vertical stabilizer 60 may be a vertical surface mounted near the tail of the air vehicle 200 and protruding above and/or below the fuselage 30. The vertical stabilizer 60 may stabilize the aircraft's "yaw," i.e. turning to the left and right, and may mount the rudder 70 which controls the aircraft's rotation along the horizontal axis and prevents adverse yaw.

The wing mechanism 40 may include first and second portions 40A and 40B connected by a center portion 40C to the fuselage 30 (See FIG. 4). The first and second portions 40A and 40B may be embodied as two separate wings connected to one another, or may be embodied as one single wing. Each portion 40A, 40B may have a respective end 42A, 42B, also called a wing tip.

The first and second portions 40A and 40B of the wing mechanism 40 may extend substantially perpendicular to the fuselage 30, as shown in FIG. 3. Alternatively, the first and second wing portions 40A and 40B may extend out at an angle from the fuselage 30 on both sides of the fuselage 30. For example, the wing portions 40A, 40B may be angled backward towards the vertical stabilizer 60.

As shown in FIG. 4, a space 80 may be defined between the fuselage 30 and the wing mechanism 40. For example, the space 80 may be defined by the connection between the fuselage 30 and the center portion 40C of the wing mechanism 40. Alternatively, the space 80 could also be defined in the fuselage 30 only and, for example, at a distance apart from the center portion 40C of the wing mechanism 40. This may be appropriate where the wing portions 40A and 40B are angled with respect to the fuselage 30, rather than perpendicular, as discussed above.

Figure 1:
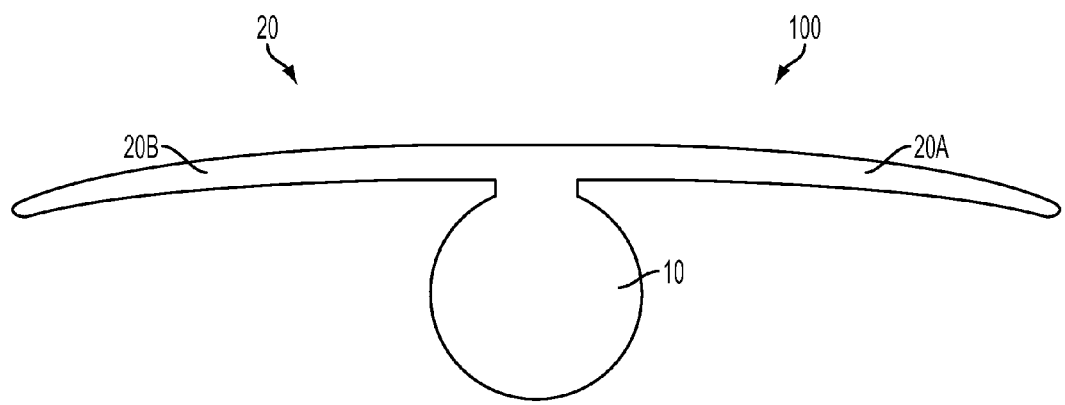
FIG. 1 depicts a front cross-sectional view of a prior art air vehicle with bendable wings in an operating position.
Figure 2:
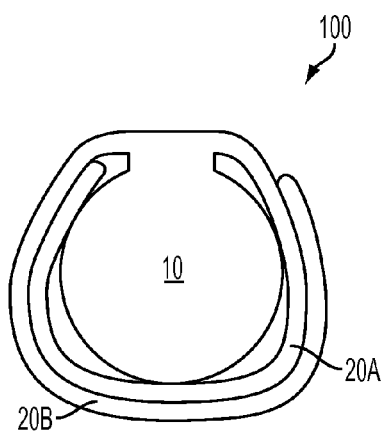
FIG. 2 depicts a front cross-sectional view of a prior art air vehicle with bendable wings in a storage position.

These embodiments are in contrast to air vehicles 100 generally known in the art, for which there is no space and the wing mechanism 20 sits flush with the fuselage 10, as shown in FIGS. 1 and 2. According to one embodiment of the present invention, the space 80 may be of sufficient size to insert an end 42A, 42B of either or both of the first or second portions 40A, 40B of the wing mechanism 40. The connection between the fuselage 30 and the center portion 40C of the wing mechanism 40 may be permanent, removable, and/or adjustable based on molding and/or attachment mechanisms known in the art. For example, the top portion of the fuselage 30 may be contoured such that space 80 is defined when the wing mechanism 40 is attached to the air vehicle 200.

Figure 5:
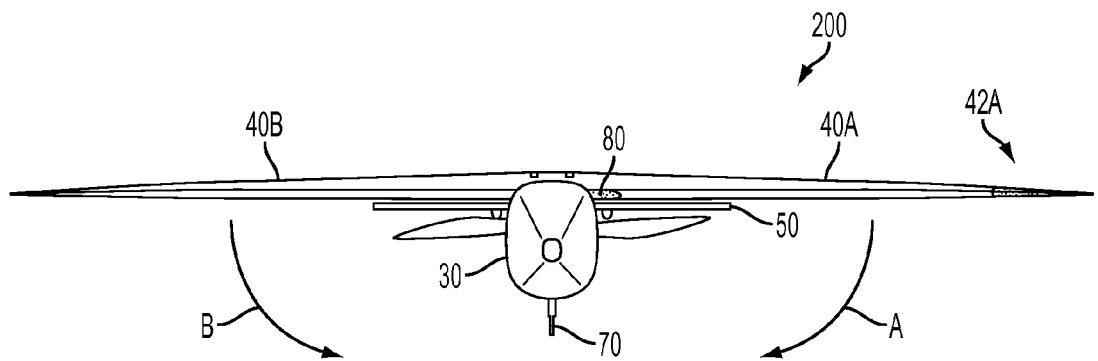
FIG. 5 depicts a front view of the air vehicle in the operating position according to FIG. 3.
Figure 6:
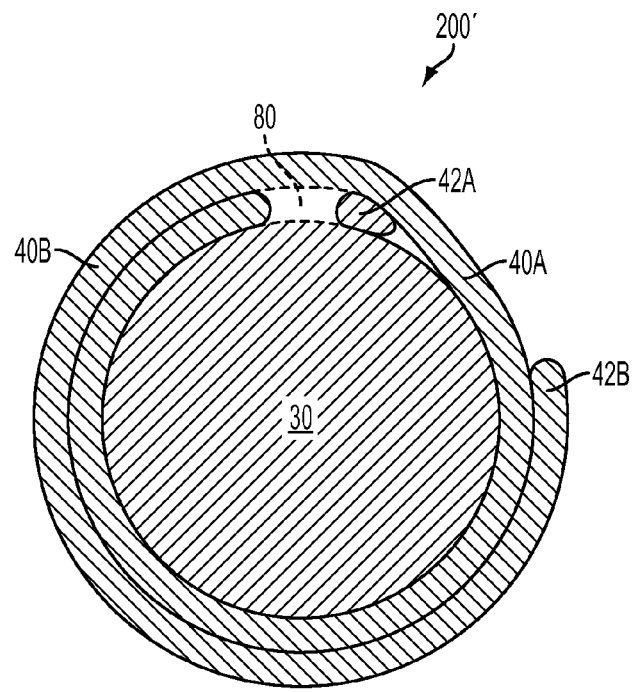
FIG. 6 depicts a front cross-sectional view of the air vehicle in a stored position, according to an embodiment of the present invention.

As shown in FIG. 5, first portion 40A of the wing mechanism 40 may be wrapped around the fuselage 30 in direction A. The end 42A of the wrapped first portion 40A may pass through space 80 to secure it to the fuselage 30. The use of space 80 may allow the wing mechanism 40 to have an increased wing span that allows, for example, increased flight capabilities. The second portion 40B of the wing mechanism 40 may then wrap around fuselage 30 in the opposite direction B to create a tightly wrapped air vehicle 200', as shown in FIG. 6.

In another embodiment, the second portion 40B of the wing mechanism 40 may first wrap around fuselage 30 in direction B, and the end 42B may pass through space 80. The first portion 40A may then wrap around the second portion 40B which is in the wrapped position around the fuselage 30.

In a further embodiment, both wing portions 40A, 40B may wrap around the fuselage 30, and a portion of one or both wing portions 40A, 40B may insert into and/or pass through space 80.

According to one embodiment, the fit of either ends 42A, 42B in the space 80 may be tight or loose. A tighter fit of end 42A in the space 80 may ensure that the first portion 40A will not unwrap from the fuselage 30 during storage, whereas a looser fit may ensure that the first portion 40A will rapidly release from the fuselage 30 for use. The space 80 may be adapted to ensure that the end 42A of the first portion 40A is both secured during storage and rapidly releasable during use.

Figure 7:
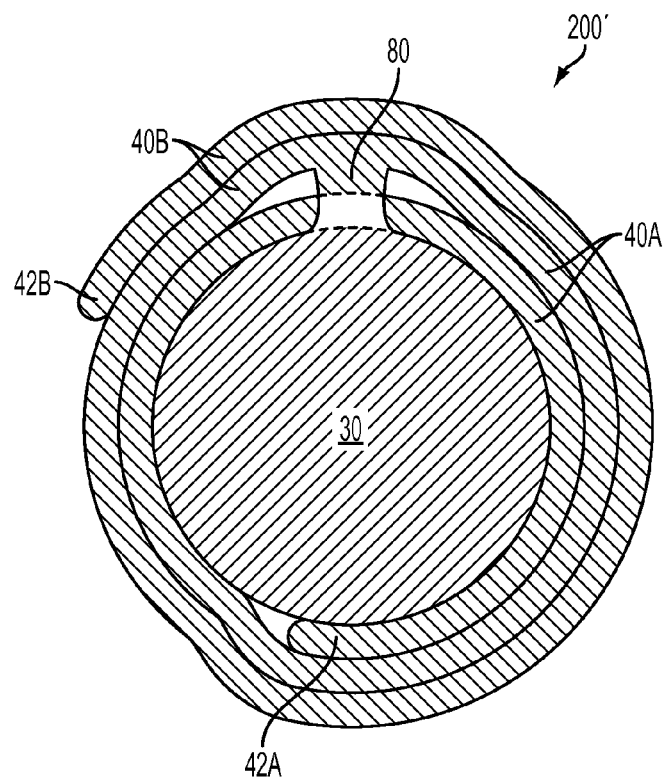
FIG. 7 depicts a front cross-sectional view of the air vehicle in a stored position, according to a different embodiment of the present invention.

FIG. 6 shows an embodiment of the air vehicle 200' in a stored position where the end 42A of the first portion 40A passes partially through the space 80. FIG. 7 is an alternative embodiment where the end 42A of the first portion passes entirely through the space 80 and wraps another halfway around the fuselage 30. The structure of the wing mechanism 40 and fuselage 10 for wrapping is not limited to these two examples and may accommodate an unlimited number of wing spans, i.e. lengths, of the wing mechanism 40. Thus, whereas the wing 20A of aircraft 100 in FIGS. 1 and 2 may wrap around less than the complete circumference, or exterior surface, of the fuselage 10, the end 42A of the first portion 40A of the wing mechanism 40 in FIGS. 6 and 7 may pass through gap 80 and thus continue to wrap around the fuselage 30 beyond one circumference. Alternatively, the second portion 40B of the wing mechanism 40 may be wrapped around the fuselage 10 first and the first portion 40A may be wrapped around the wrapped second portion 40B of the wing mechanism 40.

Figure 8:
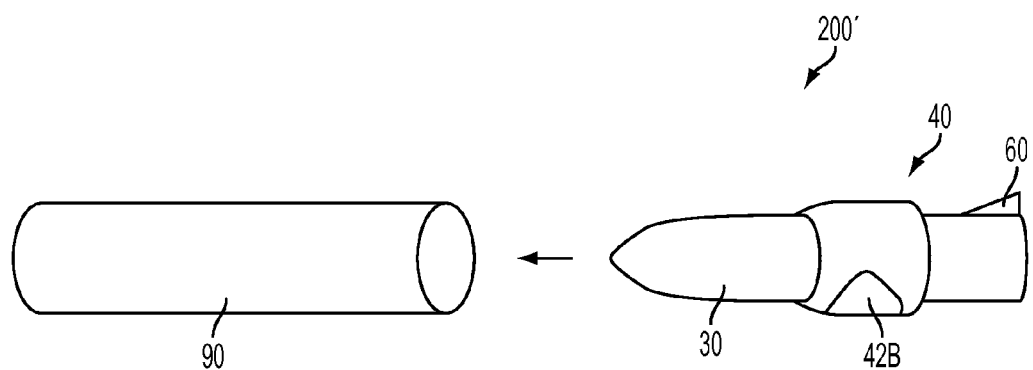
FIG. 8 depicts a schematic view of the air vehicle in the stored position and a storage container for the air vehicle, according to an embodiment of the present invention.

As shown in FIG. 8, the air vehicle 200' in the stored position may be inserted into a storage container 90, for example, a launch tube. In an exemplary embodiment, the first and second portions 40A, 40B have been wrapped around the fuselage 30 for a tight fit into the storage container 90. The horizontal stabilizer 50, vertical stabilizer 60, and rudder 70 of the air vehicle 200' may also be made of flexible material that can bend to fit into the cross-section of the storage container 90.

According to one embodiment, the end 42B of the second portion 40B may not be attached or fixed when wrapped around the first portion 40A. The end 42B may be held in place by the user when inserting the air vehicle 200' into the storage container 90. Upon later removal of the air vehicle 200' from the storage container 90, the second portion 40B of the air vehicle 200 may flex into the operating position shown in FIGS. 3 and 5. The flexing or unwrapping of the second portion 40B may also release the end 42A from the space 80 causing the first portion 40A to flex into the operating position, as well. Thus, this rapid release mechanism may allow a user to operate the air vehicle immediately after removing it from the storage container 90.

According to another embodiment, a fastening device (not shown) may fix the position of the second portion 40B of the wing mechanism 40 to the wrapped air vehicle 200' in the stored position. In this embodiment, a user would need to unfasten the second portion 40A in order to release the first and second portions 40A, 40B for use after removal from the storage container 90.

The present description need not be limited to air vehicles or aircraft and can apply to any apparatus having bendable or flexible members for storage. In this embodiment, an apparatus may include an axially-defined object, a flexible member connected to the object, and a space for receiving ends of the flexible members. The space may be defined between the object and the flexible member, or only in the object. According to one exemplary embodiment, the space may be defined by a connection of the object and the flexible member. According to another exemplary embodiment, the space may be a hole or gap in the object and/or flexible member. An end of the flexible member may be adapted to fit into the space when the flexible member is wrapped around the object. Similar to the embodiments above, the end of the flexible member may be adapted to pass entirely through or partially through the space.

According to one embodiment, the flexible member may include a first portion having a first end, a second portion having a second end, and a center portion. The space may be defined between the object and the center portion of the flexible member. In this embodiment, the first portion of the flexible member may be adapted to wrap around the object, the first end may be adapted to pass through the space, and the second portion of the flexible member may be adapted to wrap around the wrapped first portion of the flexible member.

According to another embodiment, the space may be defined only in the object and may be positioned at a distance from the center portion of the flexible member. This embodiment may be used where the first and second portions of the flexible member extend from the object at an angle that is not substantially perpendicular.

According to a further embodiment, the space between the flexible member and object may be sized to allow the end of the flexible member to pass between the object and flexible member for storage, and to allow the end of the flexible member to rapidly release to unwrap the flexible member for use.

A method for packaging an air vehicle 200 is also feasible. Such method may include the steps of: wrapping a wing mechanism 40 around a fuselage 30, where the wing mechanism 40 is connected to the fuselage 30; and inserting an end 42A of the wrapped wing 40 through a space 80 positioned between the wing mechanism 40 and the fuselage 30.

According to a further embodiment, the method may include the steps of: connecting a center portion 40C of the wing mechanism 40 to the fuselage 30; wrapping a first portion 40A of the wing mechanism 40 around the fuselage 30; inserting a first end 42A of the wrapped first portion 40A of the wing mechanism 40 through the space 80 defined by the connection of the wing mechanism 40 and the fuselage 40; and wrapping a second portion 40B of the wing mechanism 40 around the wrapped first portion 40A of the wing mechanism 40.

According to one embodiment, the method may further include inserting the fuselage 30 and the wrapped wing mechanism 40 into a storage container 90 for storage. According to a further embodiment, the method may also include removing the wrapped air vehicle 200' from the storage container 90, and rapidly releasing the end 42A of the wrapped wing mechanism 40 from the space 80 defined between the wing mechanism 40 and the fuselage 30 for use.

The embodiments, as described above, may resolve the issues of poor flight performance caused by wingspan limitations, as experienced by aircraft and unmanned aerial aircraft currently available on the market. The embodiments of the present invention may allow for an uninhibited aircraft wingspan, thus allowing such aircraft to substantially increase in efficiency and competitive advantage.

The embodiments herein may apply to any application requiring a folding wing concept where the wing is formed from any composite lay up (for example, fiberglass or carbon fiber), and is wrapped around an axially-defined object (a fuselage, for example) to fit inside a pre-determined and constrained volume, while allowing the wing to unfold rapidly, smoothly and reliably.

It will be understood that the above description of the present invention is susceptible to various modifications, changes and adaptations, and that the same are intended to be comprehended within the meaning and range of equivalents of the appended claims.

What is claimed is:

1. An air vehicle, comprising:
   a fuselage having a top portion;
   a wing connected to the fuselage at the top portion, the wing having a top surface, a bottom surface, and two ends positioned opposite each other, wherein the wing is substantially perpendicular to the fuselage; and
   at least the bottom surface of the wing and the top portion of the fuselage defining a space therebetween, wherein the space is sized to receive a portion of the wing when the wing is wrapped around the fuselage.

2. The air vehicle of claim 1, wherein the portion of the wing is adapted to pass entirely through or partially through the space.

3. The air vehicle of claim 1, wherein the wing comprises a first portion having a first end of the two ends, a second portion having a second end of the two ends, and a center portion.

4. The air vehicle of claim 3, wherein the space is defined between the fuselage and the center portion of the wing.

5. The air vehicle of claim 4, wherein the first portion of the wing is adapted to wrap around the fuselage, and the first end is adapted to pass through the space in a wrapped position of the first portion, and the second portion of the wing is adapted to wrap around the first portion in the wrapped position.

6. The air vehicle of claim 1, wherein the space is sized to allow the end of the wing to pass between the fuselage and wing for storage, and to allow the end of the wing to rapidly release for use.

7. The air vehicle of claim 1, wherein the space is sized to allow the wing to pass between the fuselage and wing multiple times for storage.

8. An air vehicle, comprising:
   a fuselage having a top portion;
   a wing connected to the fuselage at the top portion, the wing having a top surface, a bottom surface, and two ends positioned opposite each other, wherein the wing extends out from the fuselage on both sides of the fuselage; and
   at least the bottom surface of the wing and the top portion of the fuselage defining a space that is sized and positioned to receive a portion of the wing when the wing is wrapped around the fuselage.

9. The apparatus of claim 8, wherein the wing comprises a first portion having a first end of the two ends, a second portion having a second end of the two ends, and a center portion.

10. The apparatus of claim 9, wherein the space is defined between the top portion the fuselage and the center portion of the wing.

* * * * *